Aug. 16, 1932.　　　K. E. PEILER　　　1,871,556
GLASS GATHERING AND FORMING MACHINE
Filed Feb. 6, 1929
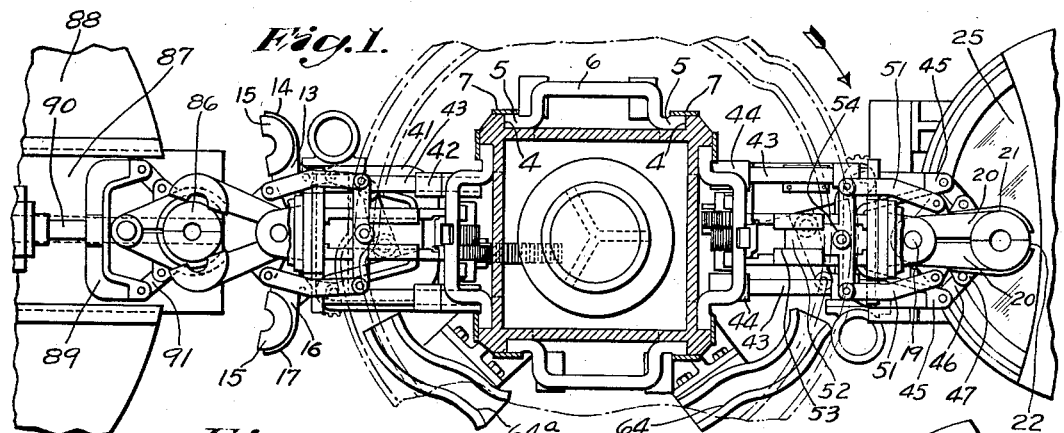
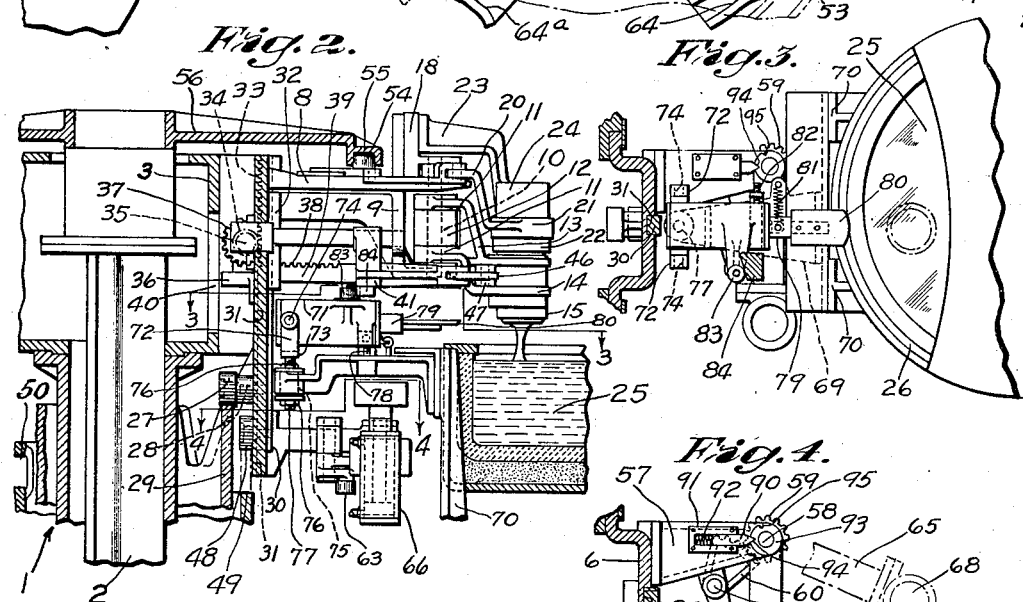
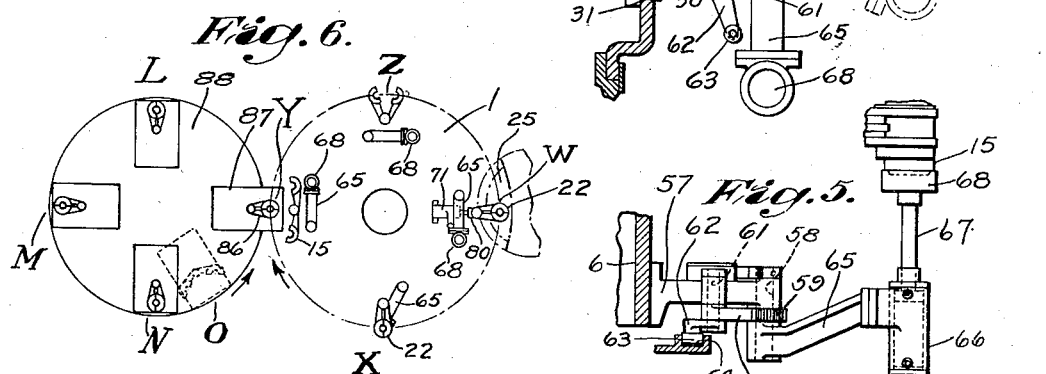
Inventor:
Karl E. Peiler
by Robert D. Brown
Attorney
Witness:
Winslow B. Thayer Patented Aug. 16, 1932

1,871,556

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GLASS GATHERING AND FORMING MACHINE

Application filed February 6, 1929. Serial No. 337,941.

My invention relates generally to the manufacture of articles of glassware and more particularly to a machine of that type which includes a rotary carrier on which are mounted a plurality of glass gathering units, each of such units including an open bottomed parison mold that is dipped at the proper time to the surface of a gathering pool of molten glass to permit a charge of glass to be drawn thereinto by suction, the gathered glass then being severed from the glass of the pool and formed, during part of a cycle of rotation of the carrier, into a parison which is subsequently transferred to a finishing mold and formed in the latter into the finished article of glassware.

It is usual in a machine of the general type just described to provide an individual severing means for each of the gathering units on the rotary carrier, such severing means being mounted on the carrier for movement with its associated gathering unit. The severing means of prior machines of the general type just mentioned may comprise a single cutting blade that is moved at the proper time across the bottom of the gathering mold to shear the glass in the latter from the glass of the pool, as in the well-known Owens type of suction gathering machine. It also has been proposed to employ a pair of shear blades in association with each gathering unit on the rotary carrier, such shear blades being opened and closed by suitable operating mechanism, usually pneumatic, so as to sever the connecting glass between the gathered charge and the glass of the pool at the proper time.

An object of the present invention is to simplify and improve the construction and operation of the glass gathering and forming machine of the general type just described, particularly the severing mechanism of such machine, by providing a single severing mechanism that is adapted to cooperate with all the gathering units on a rotary carrier successively so as to sever the connecting glass between the gathered charge in the gathering receptacle of each unit and the gathering pool as such gathering receptacle is moved in its turn from the glass gathering position, thereby eliminating or simplifying many of the operating and timing parts which have been heretofore required.

A further object of the invention is to improve the mechanism that is provided in a machine of the type described for closing the lower end of each parison mold at the proper time in the cycle of rotation of the carrier to permit preliminary blowing or expanding of the glass to definite external shape in such mold.

Other objects and advantages of the invention will be apparent from the following detailed description of a practical embodiment thereof and from a consideration of the accompanying drawing which illustrate that embodiment of the invention.

According to the present invention, a plurality of glass gathering and parison forming units may be mounted on a rotary carrier, each of such units preferably including a partible parison mold, a partible neck ring or mold cooperating therewith, and a combined suction and blow head also cooperating therewith, together with operating mechanism for lowering the parison mold, the neck ring and the suction and blow head as a unit at the proper time in the cycle of rotation of the carrier to cause contact of the lower end of the parison mold with the surface of a gathering pool of molten glass. Suction then is produced in the parison mold and neck ring to draw a charge of glass thereinto from the pool. A severing means is movably mounted adjacent to the gathering pool and is operated at the proper time to sever the gathered glass in each parison mold from the glass of the pool as such parison mold is moved by the rotation of the carrier from the gathering station. Such severing means may comprise a single blade pivotally supporting for swinging movement about an axis parallel with the axis of rotation of the carrier and provided with operating means for projecting such blade across the bottom of each parison mold as the latter moves away from the gathering station. The severing mechanism and carrier are provided with cooperative means for causing the pivoted severing means to travel with the charged parison mold while the severing operation is taking place and the severing means is then returned to its initial position for cooperation with the succeeding parison mold as the latter moves away from the gathering station. In lieu of a single severing blade, the improved severing mechanism may comprise a pair of pivoted cooperating shear blades which are operated so as to be closed at the proper time to sever the glass within each parison mold from the glass of the pool.

Each gathering unit of the improved machine has associated therewith a bottom plate that is mounted for swinging movement about an axis parallel with the axis of rotation of the carrier and also is provided with suitable operating mechanism for moving the bottom plate vertically at the proper times to and from position to cover the lower end of the charged parison mold so as to permit the preliminary blowing of the glass therein to definite external shape. The improved bottom plate structure includes operating mechanism timed to swing the bottom plate inwardly with respect to the axis of rotation of the carrier as required to avoid contact with the gathering pool as the associated gathering unit is brought to a position to gather glass from the pool and for swinging the bottom plate outwardly with respect to the axis of rotation of the carrier into vertical alignment with the associate parison mold after such parison mold has been charged with glass from the pool and has been moved by rotation of the carrier away from the pool, the bottom plate then being moved upwardly into capping relation with the lower end of the parison mold.

In the drawing:

Figure 1 is a fragmentary plan sectional view of a glass gathering and forming machine of the two-table type, embodying the present invention, showing two oppositely disposed glass gathering and parison forming units on a rotary carrier, the remaining glass gathering and parison forming units being omitted, one of the illustrated glass gathering and parison forming units being shown above a glass gathering pool and the other glass gathering and parison forming unit being shown in position to transfer a parison to a finishing mold on a rotary finishing mold table;

Fig. 2 is a fragmentary vertical sectional view through part of the structure shown in Fig. 1;

Fig. 3 is a horizontal sectional view along the line 3—3 of Fig. 2;

Fig. 4 is a horizontal sectional view along the line 4—4 of Fig. 2, illustrating particularly the bottom plate and its operating mechanism;

Fig. 5 is a side elevation of the bottom plate and bottom plate operating mechanism shown in Fig. 4, the bottom plate being shown in a position outwardly of that indicated by the full lines in Fig. 4; and Fig. 6 is a diagrammatic view, showing successive stages in the manufacture of an article of hollow glassware by a two-table machine embodying the present invention.

The supporting and operating structure for the glass gathering and parison forming units of a machine embodying the present invention may include a carrier 1 mounted to rotate about the axis of a vertical post or column 2, Fig. 2. This rotary frame or carrier 1 may be supported and rotated in any suitable known manner and by any suitable known means, none being shown as such means are well known in the art. The upper portion 3 of the rotary frame or carrier may be relatively large in cross sectional area and non-circular in cross section configuration so as to provide a plurality of circumferentially spaced lateral faces spaced from the central post or column, Fig. 1. Each of such faces may be provided with a vertical guideway 4 in which the out turned edge portions 5 of the side portions or flanges of a substantially U-shaped slide member 6 are retained, as by the retaining plates 7.

Each slide 6 supports the operating parts of a glass gathering and parison forming unit. Since the glass gathering and parison forming units are identical, only one of such units will be described.

In the construction shown, such unit includes a supporting arm 8 that extends radially outward from the upper portion of the slide 6. A bracket 9 that depends from the outer end portion of the arm 8 carries a vertical pivot element 10 on which are mounted the upper and lower rock sleeves 11 and the intermediate rock sleeves 12. The upper and lower rock sleeve 11 carry rocker arms 13 which support a holder 14 for a half section of a parison mold 15 while the intermediate rock sleeve 12 carries an arm 16 which supports a holder 17 for the remaining half section of the parison mold. A bracket member 18 at the outer end of the arm 8 carries a vertical pivot element 19 on which the arms 20 that support the holders 21 for the half sections of a neck ring 22 are pivoted. A further bracket 23, shown in Fig. 2 as carried by the bracket 18, supports a combined suction and blow head 24. The arrangement is such that when the parison mold 15 and the neck ring 22 are closed, as when in a position above a glass gathering pool 25, Figs. 1 and 2, the neck ring will be disposed above and in substantially fluid-tight contact with the parison mold and below but also in substantially fluid-tight contact with the combined suction and blow head, the combined suction and blow head, the neck ring and the parison mold then being vertically aligned.

The means for moving the slide 6 and the parts carried thereby vertically to cause the bottom of the closed parison mold to contact with the surface of the gathering pool and to be lifted above the level of the confining wall 26 for the gathering pool at the proper times in the cycle of rotation of the carrier 1 will now be described. Such means may comprise a cam roll 27 that is shown in Fig. 2 as being carried on a stud 28 that projects radially inward from the slide 6 in position to ride on a stationary cam track 29 which extends around the axis of rotation of the carrier 1. The working or upper surface of the cam track 29 is formed to raise and lower the associate gathering unit at the proper times in a cycle of rotation of the carrier.

The mechanism for opening and closing the parison mold at the proper times may comprise a vertically slidable rack bar 30 which is mounted to slide in a vertical groove 31 in the web of the associated slide member 6 and is retained against lateral displacement from such groove by suitable retaining means, such as the strap or cross plate indicated at 32 in Fig. 2. This rack bar 30 has teeth 33 in the inner face of a portion thereof in mesh with a relatively small pinion 34. The latter is mounted on a horizontal shaft 35 that is supported in a bearing on a bracket 36 within the confines of the slide 6, a portion of the web of the slide 6 being cut away to permit the engagement of the teeth of the pinion 34 with the teeth on the rack bar. The shaft 35 also carries a larger pinion 37 which projects through the cut away portion of the slide 6 and engages teeth 38 in the upper surface of a horizontal rack bar 39. The rack bar 39 projects through the aforesaid cut away portion of the slide 6 and may project through an opening 40 in the adjacent portion 3 of the rotary carrier. The rack bar may slide on the bottom of the cutaway portion of the slide 6 and may be further maintained in mesh with the pinion 37 by reason of being joined at its outer end to a cross head 41. The latter has sleeve portions 42 which slide on guiding and supporting rods 43, Fig. 1. The latter are carried by suitably formed portions 44 of the slide 6. The cross head 41 has outwardly extending arms 45 connected by links 46 with lugs 47 on the arms which support the holders for the halves of the parison mold. Consequently, it is obvious that longitudinal movement of the rack bar 39 in an outward direction will close the sections of the parison mold while sliding movement of the rack bar 39 in the opposite direction will open the parison mold. This sliding movement of the rack bar 39 is caused by rotation of the pinion 37 which in turn results from vertical movement of the rack bar 30. The lower end portion of the latter carries a cam roll 48 which at the proper time in a cycle of rotation of the carrier 1 rides on an upwardly inclined surface of a cam track 49, Fig. 2, so as to raise the rack bar 30 and effect closing movements of the halves of the parison mold. The engagement of the teeth of the pinions 34 and 37 with the teeth of the rack bars 30 and 39, respectively, will tend to prevent accidental longitudinal movements of both of these rack bars. Since the rack bar 30 is carried by the main slide 6, which, as hereinbefore stated, is raised and lowered periodically, the cam roll 48 may be raised with the slide 6 above the highest portion of the cam track 49 during certain parts of the cycle of rotation of the carrier 1. However, a cooperative cam member 50, as shown at the left hand of the carrier 1 in Fig. 2, is provided above the cam roll 48 at the proper place for engaging with the raised cam roll 48 to move the rack bar 30 downwardly to effect closing of the parison mold at the proper time and to guide the cam roll 48 downwardly into contact with the cam track 49.

The supporting arms for the sections of the neck ring are connected with links 51 which in turn are connected to the end portions of the head of a substantially T-shaped slide member 52, the body of which is slidable radially in a guideway 53 on the supporting arm 8. The slide member 52 is provided with a vertically disposed cam roll 54 which travels in a closed cam groove 55. The cam groove 55 extends around the axis of rotation of the carrier 1 and may be formed at the lower surface of a stationary plate 56 that is mounted on the post or column 2. This cam groove 55 is laid out so as to cause radial inward and outward movements of the T-shaped slide member 52 at the proper times to cause opening and closing of the sections of the neck ring.

The illustrated bottom plate supporting and operating structure comprises a supporting arm 57 which extends in a generally radial direction outwardly from the lower portion of the slide 6. A vertical rock shaft 58 is carried at the outer end of the arm 57. A pinion 59 on the shaft 58 is in mesh with the teeth of a gear segment 60. The latter is secured to a vertical rock shaft 61 from which extends a rocker arm 62. The shaft 61 is journalled in a bearing portion of a lateral extension of the arm 57. A cam roll 63 on the rocker arm 62 is adapted to travel in the cam grooves 64 and 64a, Fig. 1, during different parts of a cycle of rotation of the carrier 1. The cam grooves 64 and 64a are laid out so as to rock the arm 62 at the proper times, thereby swinging the gear segment 60 angularly about the axis of the rock shaft 61 and causing rocking of the shaft 58 about its axis. This in turn will cause an arm 65 on the rock shaft 58 to swing angularly about the axis of the latter. The arm 65 carries a vertically disposed cylinder 66 from which a piston rod 67 projects upwardly and supports a bottom plate 68.

The travel of the cam roll 63 along the cam track 64 will cause the bottom plate operating cylinder 66 to be swung outwardly from the full line position to Fig. 4 to the full line position of Fig. 5, in which latter position it is in vertical alignment with the associate gathering receptacle. The piston rod 67 is moved upward either during this outward swinging movement of the cylinder 66 or thereafter to dispose the bottom plate in capping relation to the lower end of the associate parison mold. The glass in the latter then may be blown and expanded in a manner well known in the art.

The travel of the cam roll 63 along the cam track 64a will result in the return of the cylinder 66 and of the bottom plate from the outwardly swung position of Fig. 5 to the full line position of Fig. 4, the piston rod 67 first having moved downward to displace the bottom plate from the associate parison mold.

The bottom plate operating cylinder may be retained in each of its positions above mentioned by means which will yield in response to actuation of the cam roll 63 by either the cam track 64 or the cam track 64a. Such retaining means may comprise a longitudinally movable latching member or detent 90 which protrudes from a pocket 91 on the supporting arm 57 and has a tapering end maintained by a spring 92 against the periphery of a collar 93 on the rock shaft 58. The pointed end of the detent 90 will enter a notch 94 in the collar 93 when the cylinder 66 is in its inwardly swung position as shown in Fig. 4 and will enter a notch 95 in the collar 93 when the cylinder 66 is in its outwardly swung position, as shown in Fig. 5, but will move out of either of such notches when the actuation of the cam roll 63 in the manner described causes a torque on the rock shaft 58.

The severing means and its operating mechanism shown in the drawing are supported on a bracket 69 which may be carried by upright supporting members 70. The latter may be secured to or form part of the frame structure of the walls of the container for the gathering pool. The bracket 69 carries a shear operating cylinder 71. The outer end of the latter, that is, the end remote from the gathering pool and nearest to the axis of rotation of the carrier 1, is disposed between upturned branches 72 of a substantially U-shaped yoke 73. Trunnions 74 on the cylinder 71 are journalled in bearings at the upper ends of the branches of the yoke 73 so that the inner end of the cylinder, that is, the end nearest to the gathering pool, may swing about a horizontal axis. The yoke is supported on the bracket 69 to swing about a vertical axis and to permit vertical adjustment of the outer end of the cylinder on the bracket 69. To this end, a vertical sleeve 75 may be journalled in a vertical bearing at the outer end of the bracket 69 and may be adjustably connected, as by means of the nuts 76, with a threaded vertical rod 77 which depends from the yoke 73 through the sleeve 75 and supports the outer end of the shear cylinder. The inner end of the shear cylinder rests on a vertically adjustable supporting member 78, which may be a jack screw on the bracket 69, when the shear cylinder is in the position shown in the drawing. The shear blade thus may be tilted upward or downward or adjusted vertically. A piston rod 79 protrudes from the inner end of the cylinder and may carry a single cutting blade 80. A spring 81 is connected at one end with the inner end of the shear cylinder and at its opposite end with a stationary support, which may be provided on the bracket 69, and tends to retain the shear cylinder against an adjustable stop 82, which may be a screw member threaded through an upstanding lug on one side of the bracket 69. In this position of the shear cylinder, projection of the piston rod will be in a direction generally radial with respect to the axis of rotation of the carrier 1. This direction may be varied within limits by adjustment of the stop 82.

The piston rod is shown in its retracted position in Figs. 1 to 3 inclusive and it of course will be understood that suitable valve mechanism, not shown, may be provided for controlling the admission and discharge of fluid pressure to opposite ends of the cylinder to effect projection and retraction of the cutting blade at the proper times. When the piston rod is projected outward, the cutting blade 80 will slide across the bottom of the parison mold to sever the glass in the mold from the glass of the pool. In lieu of a single cutting blade, a pair of pivoted shear blades may be provided and the reciprocations of the piston rod may be employed to project and retract and open and close such shear blades in a manner well known in the art. When a pair of shear blades are employed in lieu of the single cutting member, the plane of severance of the glass may be spaced adjustably from the lower end of the parison mold.

The shear cylinder 71 may carry a roller 83 on the top of its inner end portion adapted to be engaged by a depending lug 84 of the frame structure of each of the gathering and parison forming unit as such unit moves from a glass gathering position. The shear cylinder 71 then will swing about the axis of its vertical support 77 until the lug 84 disengages the roll 83, whereupon the spring 81 will return the outer end of the shear cylinder against the stop 82 and the severing member then will be in position to cooperate with the parison mold of the succeeding gathering unit.

The operation of the parts that have been described may be substantially as follows:

The gathering unit shown above the glass gathering pool at the right hand side of Figs. 1 and 2, has been elevated after a charge of glass has been gathered from the pool. The rotation of the carrier, in the direction of the arrow indicated in Fig. 1, has caused the cam 27 to ride up an inclined portion of the cam track 29 and has raised the charged right hand parison mold sufficiently to clear the confining wall of the gathering pool. The lug 84 of the frame structure of the right hand gathering unit will contact with the roller 85 on further rotation of the carrier 85 and will cause the blade supporting end of the cylinder to swing with the charged parison mold for part of the cycle of rotation of the carrier 1. During this movement of the shear blade operating cylinder with the charged parison mold and before the latter moves from above the pool, the piston within the shear cylinder is actuated so as to project the cutting blade 80 across the bottom of the charged parison mold to sever the gathered glass from the glass of the pool. The severing blade then is retracted. The lug 84 moves out of engagement with the roller 83 as the rotation of the carrier 1 continues and the spring 81 returns the shear cylinder to its initial position against the stop 82.

After the charged parison mold has been swung clear of the gathering pool, the cam 64 actuates the arm 62 and the associated parts of the bottom plate supporting and operating mechanism so that the bottom plate is swung outwardly from the position shown by the full lines in Fig. 4 to the dotted line position of Fig. 4 and the full line position of Fig. 5. The piston within the cylinder 66 is actuated to raise the piston rod 67, thus moving the bottom plate 68 to capping relation with the lower end of the charged parison mold. The glass within the parison mold then may be blown and expanded to definite external shape by positive pressure applied through the combined suction and blow mold and the neck ring, or in any other suitable known manner. As the rotation of the carrier 1 continues, the gathering unit with a parison formed therein is moved toward the position of the left hand unit of Fig. 1. During this travel, the cam roll 63 is actuated by the cam track 64a to swing the bottom plate operating cylinder 60 to the position shown in full lines in Fig. 4. As a unit moves to the position of the left hand unit of Fig. 1, the halves of the parison mold are opened so that the parison will depend from the neck ring. This permits the halves of a two-part finishing mold 86 to close about the parison. The finishing mold 86 is shown as being mounted on a radial slide 87 on a rotary table 88 and as being opened and closed by mechanism which includes a cross head 89 on a reciprocating piston rod 90 and connected by links 91 with the pivoted arms which carry the halves of the finishing mold. Mechanism for controlling the radial movements of the slide 87 and of the parts thereon may be provided so that the finishing mold will travel with the parison during the opening of the neck ring and the transfer of the parison to the finishing mold. The construction and operation of the finishing mold and of its supporting and operating mechanism may be as disclosed in my prior copending application, Serial No. 323,954 filed Dec. 5, 1928.

As the rotation of the carrier continues, the halves of the parison mold and the halves of the neck ring may be left open sufficiently for their cooling and then are closed as the gathering unit approaches the position of the right hand unit of Fig. 1. Prior to reaching that position, however, the gathering unit will be lowered until the lower end of the closed parison mold contacts with the surface of the glass of the pool to permit glass to be drawn thereinto by suction. The charged gathering unit then is elevated as it again reaches the position of the right hand gathering unit of Fig. 1.

According to the diagrammatic showing of Fig. 6, the neck ring and parison mold of the glass gathering unit at the position W above the gathering pool are closed and a charge of glass has been gathered therein. The bottom plate 68 is in its inwardly swung position and the shear blade 80 is beginning to move outward for a severing operation. At the position X, the neck ring and the parison mold are still closed and the bottom plate has been swung outwardly and upwardly to position to close the lower end of the parison mold so that the glass therein may be counterblown. At the position indicated at Y, the bottom plate has been lowered and swung inwardly, the parison mold has been opened and the neck ring is shown as opening, the transfer of the parison to the finishing mold 86 on the slide plate 87 having been effected. The slide plate on the table 88 is shown in its outwardly projected position. At the position Z, the neck ring and the parison mold are still open although they may have been moved somewhat toward their closed positions and the bottom plate 68 is still in its inwardly swung inactive position. Between the positions Z and W, the neck ring and the parison molds will be closed and the gathering unit will be lowered to gather glass from the gathering pool and raised with a charge therein when the gathering and parison forming unit again reaches the position W.

In the cycle of rotation of the finishing mold table, the slide plate 87 will have moved inwardly by the time it reaches the position indicated at L. The finishing mold is closed.

The finishing mold may remain closed through the positions indicated at M and N, suitable reheating and glass forming operations taking place during this part of the cycle of rotation of the finishing mold table so that the article being made will be practically finished at the time it reaches the position N. The dotted line position indicated at O in Fig. 6 may be the takeout position for the finished article and the finishing mold is shown as open at that point to permit the removal of the finished article.

The mechanism shown in the accompanying drawing and hereinbefore described comprises only one embodiment of the invention. It is to be understood that various modifications and adaptations thereof may be provided and that the features of the invention may be modified as to combination, structure and arrangements to adapt the invention to various uses and for various conditions of service without departing from the spirit and scope of the invention.

I claim:

1. In glass gathering apparatus, a plurality of glass gathering receptacles movable successively to and from position to gather glass from a gathering pool, and severing means for successively severing the glass gathered by the respective receptacles from the glass of the pool, said severing means traveling with each of said gathering receptacles during a severing operation and then returning to position to cooperate with the succeeding receptacle.

2. In glass gathering machinery, a plurality of glass gathering receptacles, means supporting said receptacles for moving them successively to and from a glass gathering position at the surface of a gathering pool, severing mechanism, and means supporting said severing mechanism for movement with each of said gathering receptacles during the severance of the glass gathered by such receptacle from the glass of the pool and for return movement to position to cooperate with the succeeding gathering receptacle.

3. In glass gathering apparatus, a rotary carrier, a plurality of glass gathering units supported thereon to travel with the carrier and for movement successively to and from position to gather glass from a glass gathering pool, and severing mechanism pivotally supported adjacent to said gathering pool for travel with each of said gathering units during a part only of the cycle of rotation of the carrier for severing from the glass of the pool the glass gathered by each gathering unit.

4. In a glass gathering machine, a carrier mounted to rotate about a vertical axis, a plurality of glass gathering units carried by said carrier for rotation therewith and movable successively to and from position to gather glass from a glass gathering pool during each cycle of rotation of the carrier, a severing mechanism supported adjacent to the pool for swinging movement about an axis parallel with the axis of rotation of the carrier and adapted to sever successively glass gathered by the respective gathering units from the glass of the pool, and means for causing said severing mechanism to swing about the axis of its pivotal support with each gathering unit during the severance of the glass gathered by the latter and then to return to position to cooperate with the succeeding gathering unit.

5. Glass gathering apparatus comprising a carrier mounted to rotate about a vertical axis, a plurality of gathering receptacles carried by said carrier for travel therewith and movable successively to and from position to gather glass from a glass gathering pool during each cycle of rotation of the carrier, severing mechanism including a cylinder supported adjacent to said glass gathering pool for swinging movement about an axis parallel to the axis of rotation of the carrier, a piston rod protruding from the cylinder toward the gathering pool and severing means actuated by the outward movement of the piston rod with respect to the cylinder to effect severance from the glass of the pool of the glass gathered by each gathering receptacle, and means for causing said cylinder and said severing means to swing about the axis of its pivotal support with each of the gathering receptacles during the severance of the glass gathered by the latter and then to return to position to cooperate with the succeeding gathering receptacle.

6. Glass gathering apparatus comprising a carrier mounted to rotate about a vertical axis, a plurality of gathering receptacles carried by said carrier for travel therewith and movable successively to and from position to gather glass from a glass gathering pool during each cycle of rotation of the carrier, severing mechanism including a cylinder supported adjacent to said glass gathering pool for swinging movement about an axis parallel to the rotation of the carrier, a piston rod protruding from the cylinder toward the gathering pool and severing means actuated by the outward movement of the piston rod with respect to the cylinder to effect severance from the glass of the pool of the glass gathered by each gathering receptacle, cooperative elements carried by said cylinder and movable with the carrier, respectively, for swinging said cylinder and the severing means in one direction about the axis of the pivotal support for the cylinder to cause said severing means to travel with each gathering receptacle during the severance from the glass of the pool of the glass gathered by such receptacle, and spring means for causing said cylinder to swing in the opposite direction about the axis of its pivotal support after such severing operation to return the severing means to position to cooperate with the succeeding gathering receptacle.

7. In glass gathering apparatus, a plurality of glass gathering receptacles, means movably supporting said glass gathering receptacles for moving them successively to and from position to gather glass from a glass gathering pool, a stationary support adjacent to said gathering pool, a cylinder mounted thereon for vertical adjustment and for swinging movement about a vertical axis, a reciprocable piston rod extending from the cylinder toward the glass gathering pool, a severing member carried by said piston rod in position to cooperate with each of said gathering receptacles after glass has been gathered by the latter to sever such gathered glass from the glass of the pool on outward movement of the piston rod with respect to said cylinder, and means governing the swinging movement of said cylinder about the axis of its pivotal support to cause said severing member to travel with each of said gathering receptacles during the severance of the glass gathered by the latter and then to return to position to cooperate with the succeeding gathering receptacle.

8. In glass gathering apparatus, a plurality of glass gathering receptacles, means movably supporting said glass gathering receptacles for moving them successively to and from position to gather glass from a glass gathering pool, a stationary support adjacent to said gathering pool, a cylinder mounted thereon for swinging movement about a vertical axis, a reciprocable piston rod extending from the cylinder toward the glass gathering pool, a severing member carried by said piston rod in position to cooperate with each of said gathering receptacles after glass has been gathered by the latter to sever such gathered glass from the glass of the pool on outward movement of the piston rod with respect to said cylinder, means governing the swinging movement of said cylinder about the axis of its pivotal support to cause said severing member to travel with each of said gathering receptacles during the severance of the glass gathered by the latter and then to return to position to cooperate with the succeeding gathering receptacle, and means for adjusting the extent of the return swinging movement of said cylinder.

9. In glass gathering mechanism, a fixed supporting member adjacent to a glass gathering pool, severing mechanism comprising a pressure fluid cylinder, a reciprocable piston rod protruding from the inner end of the cylinder and a severing member operable by said piston rod, an adjustable mounting for supporting the outer end of said cylinder on said fixed supporting member so as to permit vertical adjustment of the cylinder and also swinging movements of the inner end of the cylinder about both vertical and horizontal axes, a vertically adjustable rest member on said fixed support for supporting the inner end of said cylinder, a plurality of open bottomed glass gathering receptacles movable successively to and from position to gather glass from said pool and to permit severance of the gathered glass from the glass of the pool by said severing member, means for causing swinging of said cylinder about the axis of its vertical pivot as each gathering receptacle moves from its glass gathering position to cause travel of the severing member with said receptacle during a severing operation, and other means for swinging said cylinder about the axis of its vertical pivot after each severing operation to return said severing member to position to cooperate with the succeeding gathering receptacle.

10. In glass gathering apparatus, a rotary carrier, a glass gathering unit carried thereby, said unit comprising a vertically movable slide member, a supporting arm extending radially outward from the slide member, a glass gathering receptacle comprising a pair of partible sections each supported to swing about a pivotal support to permit opening and closing of said receptacle, and means for periodically opening and closing said receptacle, said means comprising a radially reciprocable cross head, links connecting said cross head with the respective sections of the receptacle, a rack bar for reciprocating said cross head, a pinion mounted for rotation about a horizontal axis and in mesh with the teeth of said rack bar, a second pinion connected to rotate said first named pinion, a vertically movable rack bar having teeth in mesh with the teeth of the second pinion, and cam means for causing upward and downward movements of said second named rack bar as said carrier rotates.

11. In glass working machinery, a rotary carrier, an open bottomed glass gathering receptacle carried by the carrier and arranged to be moved by the rotation of the carrier to and from position to gather glass from a glass gathering pool, bottom plate mechanism comprising a vertical cylinder supported to swing about a vertical axis inwardly and outwardly with respect to the axis of the carrier to and from a position below and in vertical alignment with the gathering receptacle, a piston rod protruding from the upper end of the cylinder, a bottom plate supported at the upper end of the piston rod, and cam controlled operating mechanism for swinging said bottom plate operating cylinder about the axis of its pivotal support to and from alignment with the gathering receptacle at the proper time in the cycle of rotation of the carrier.

12. In glass working machinery, a rotary carrier, an open bottomed glass gathering receptacle carried by the carrier and arranged to be moved by the rotation of the carrier to and from position to gather glass from a glass gathering pool, bottom plate mechanism comprising a vertical cylinder supported to swing about a vertical axis inwardly and outwardly with respect to the axis of the carrier to and from a position below and in vertical alignment with the gathering receptacle, a piston rod protruding from the upper end of the cylinder, a bottom plate supported by the piston rod, stationary cam means adjacent to said carrier, a cam roll movable with said carrier for contact with said cam means during part of the rotation of the carrier, and motion transmitting mechanism actuated by said cam roll for swinging said bottom plate operating cylinder about the axis of its pivotal support outward into alignment with the gathering receptacle during part of the cycle of rotation of the carrier and inward out of alignment with the gathering receptacle and clear of the gathering pool during another part of the cycle of rotation of the carrier.

13. In glass working machinery, a rotary carrier, an open bottomed glass gathering receptacle carried by the carrier and arranged to be moved by the rotation of the carrier to and from position to gather glass from a glass gathering pool, bottom plate mechanism comprising a vertical cylinder supported to swing about a vertical axis inwardly and outwardly with respect to the axis of the carrier to and from a position below and in vertical alignment with the gathering receptacle, a piston rod protruding from the upper end of the cylinder, a bottom plate supported on the piston rod, stationary cam means adjacent to said carrier, a cam roll movable with said carrier for contact with said cam means during part of the rotation of the carrier, and motion transmitting mechanism actuated by said cam roll for swinging said bottom plate operating cylinder about the axis of its pivotal support outward into alignment with the gathering receptacle during part of the cycle of rotation of the carrier and inward out of alignment with the gathering receptacle and clear of the gathering pool during another part of the cycle of rotation of the carrier, and means for yieldingly maintaining said bottom plate operating cylinder in either of said positions.

14. In glass gathering apparatus, a plurality of glass gathering receptacles movable successively to and from position to gather glass from a gathering pool, means for actuating said receptacles, severing means for successively severing the glass gathered by the respective receptacles from the glass of the pool, means for supporting said severing means for traveling with each of said gathering receptacles during a severing operation and for the return of said severing means to a position for cooperation with the succeeding receptacle, and means operating in timed relation to the movement of said receptacles with respect to the gathering position thereof for causing such traveling of the severing means.

Signed at Hartford, Connecticut, this 29th day of January, 1929.

KARL E. PEILER.